(No Model.) 5 Sheets—Sheet 1.

E. O. SCHLICK.
BALANCING OF STEAM OR LIKE MOTIVE POWER ENGINES.

No. 594,289. Patented Nov. 23, 1897.

(No Model.) 5 Sheets—Sheet 2.
E. O. SCHLICK.
BALANCING OF STEAM OR LIKE MOTIVE POWER ENGINES.
No. 594,289. Patented Nov. 23, 1897.
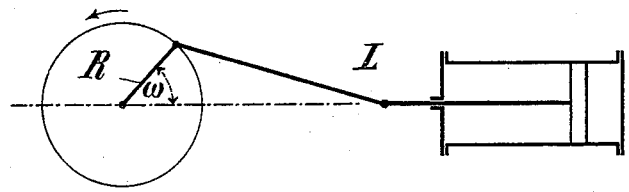
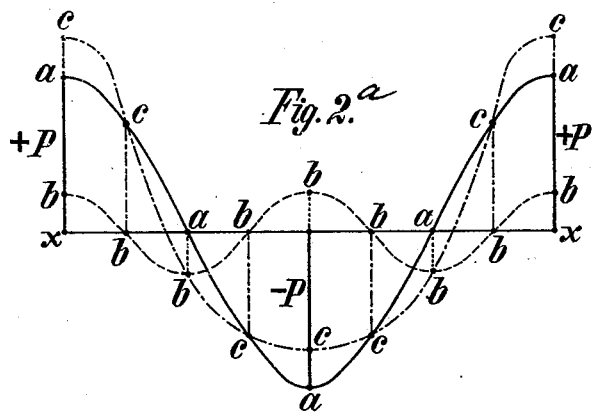
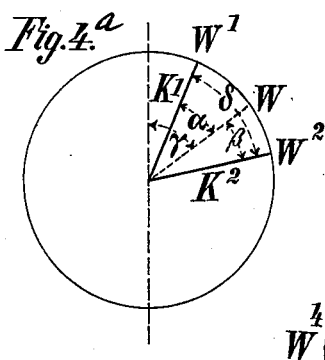
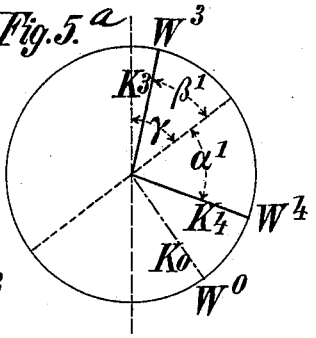
Witnesses
Inventor
Ernst Otto Schlick,
By (No Model.) 5 Sheets—Sheet 3.
E. O. SCHLICK.
BALANCING OF STEAM OR LIKE MOTIVE POWER ENGINES.
No. 594,289. Patented Nov. 23, 1897.
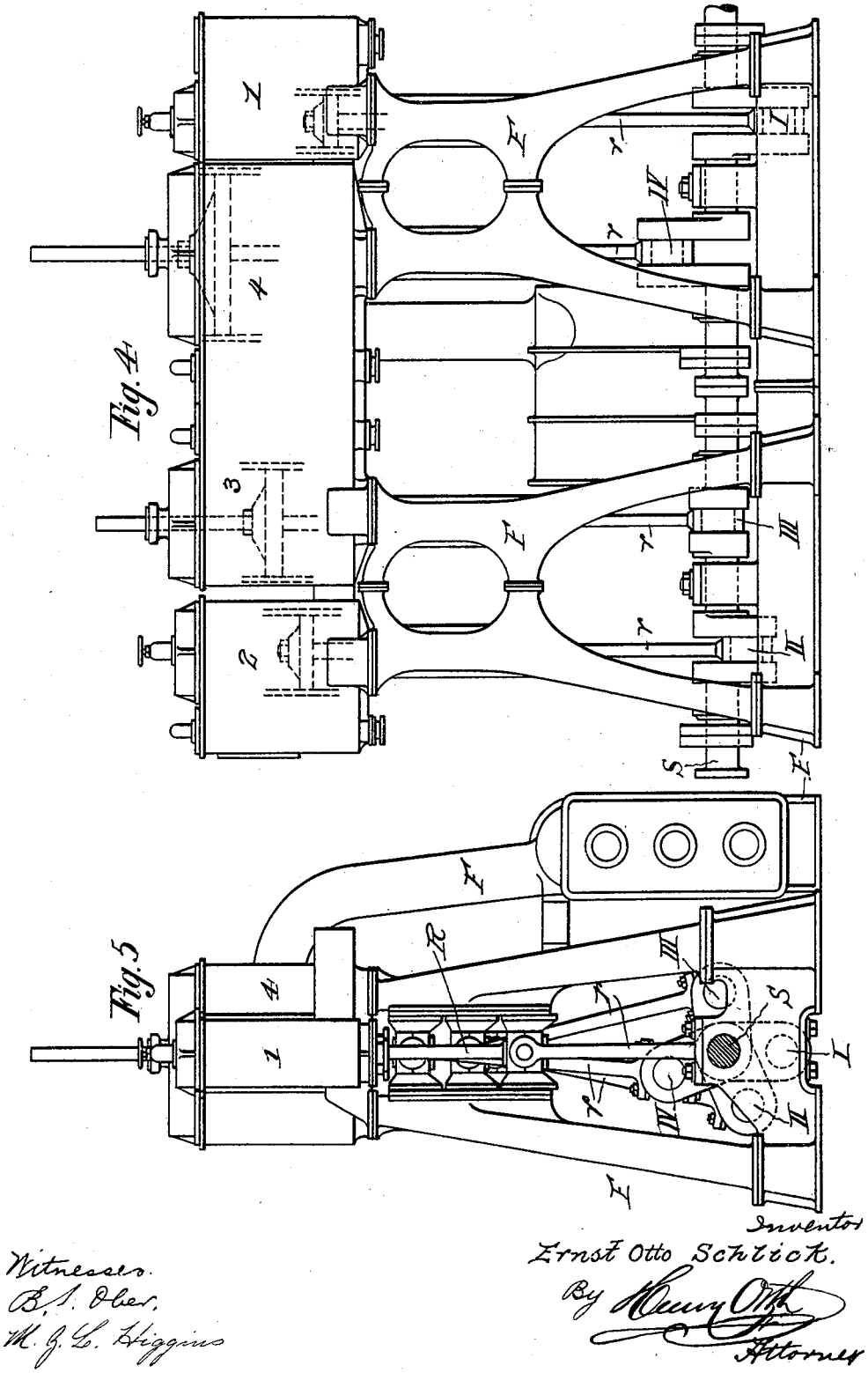

(No Model.) 5 Sheets—Sheet 4.
E. O. SCHLICK.
BALANCING OF STEAM OR LIKE MOTIVE POWER ENGINES.
No. 594,289. Patented Nov. 23, 1897.
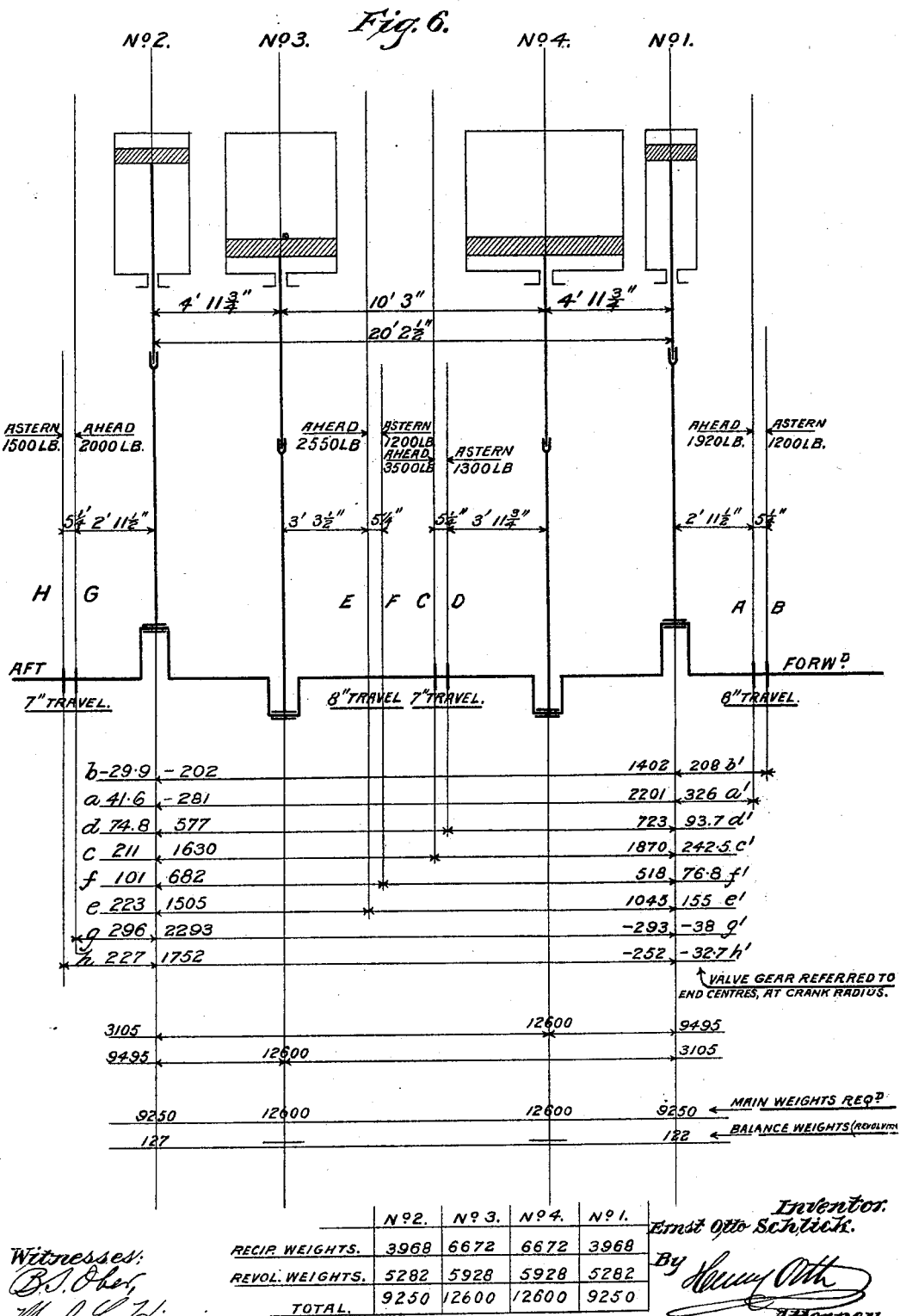

(No Model.)
E. O. SCHLICK.
BALANCING OF STEAM OR LIKE MOTIVE POWER ENGINES.
No. 594,289.
Patented Nov. 23, 1897.
5 Sheets—Sheet 5.
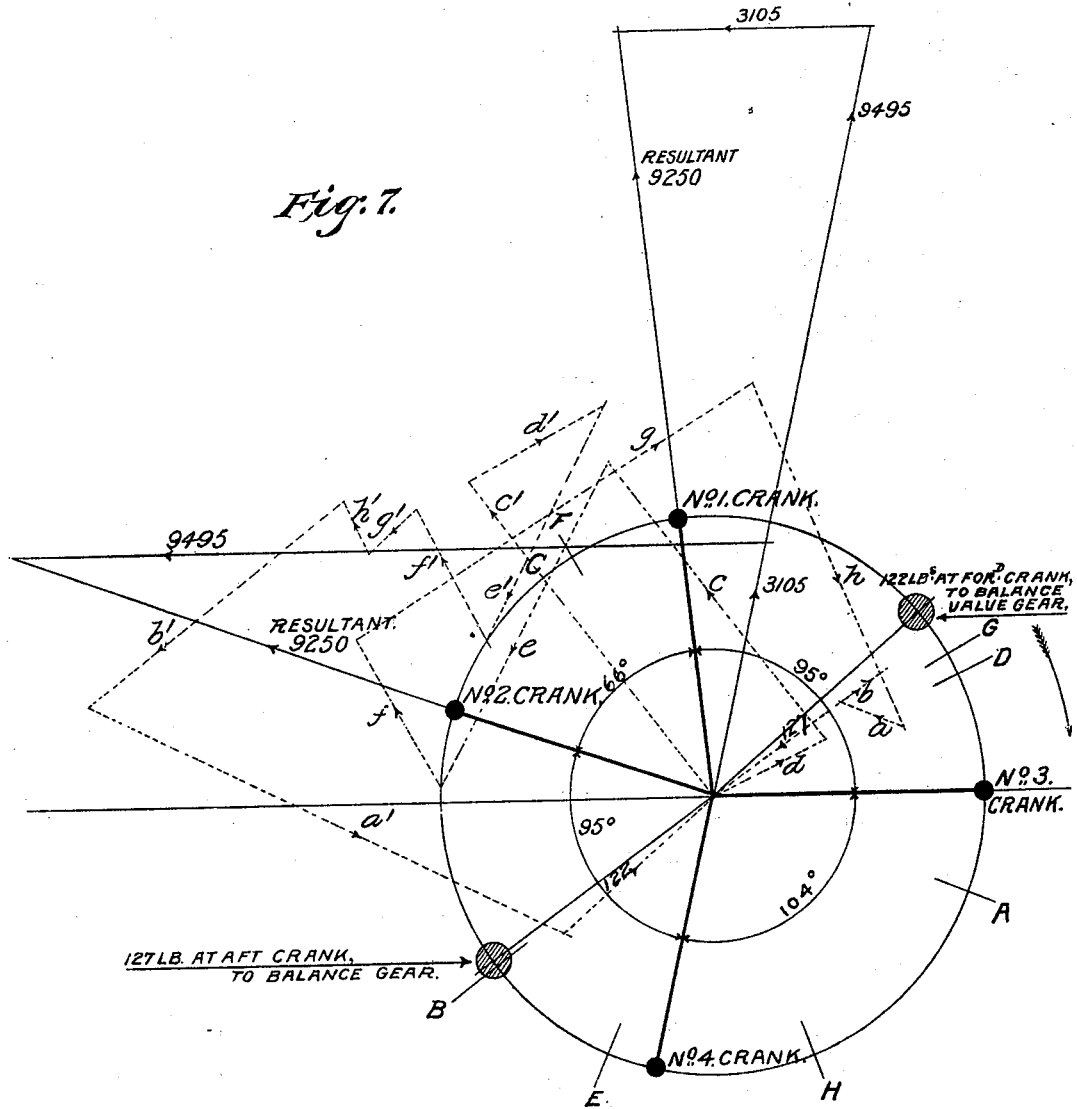

UNITED STATES PATENT OFFICE.

ERNST OTTO SCHLICK, OF HAMBURG, GERMANY, ASSIGNOR TO THE YARROW SCHLICK & TWEEDY SYSTEM, LIMITED, OF LONDON, ENGLAND.

BALANCING OF STEAM OR LIKE MOTIVE-POWER ENGINES.

SPECIFICATION forming part of Letters Patent No. 594,289, dated November 23, 1897.

Application filed September 6, 1895. Serial No. 561,630. (No model.)

*To all whom it may concern:*

Be it known that I, ERNST OTTO SCHLICK, a subject of the German Emperor, and a resident of Hamburg, in the German Empire, have invented certain new and useful Improvements Relating to the Balancing of Steam or Like Motive-Power Engines, of which the following is a specification.

This invention relates to improvements in steam and like motive-power engines in which the injurious results due to the action of the moving masses are as far as possible compensated, all but the results due to the finite length of the connecting and eccentric rods, and which engines I have described in a separate application for Letters Patent for improvements in steam and like motive-power engines, filed of even date with this; and the object of my improvements is to compensate in such steam and like motive-power engines also the results or inaccuracies due to the finite length of the said connecting and eccentric rods hitherto not taken into consideration. Although the effects of these forces are in general but slight and immaterial they will still act injuriously in many cases, and means for obviating such injuriously-acting forces will be a great advantage in steam and like motive-power engine building. I attain this object by the hereinafter specified means, of which the following is a full, clear, and exact description, such as will enable others skilled in the art to which it appertains to make and use the same, reference being had to the accompanying drawings, and to letters or figures of reference marked thereon, which form a part of this specification.

Figure 1:
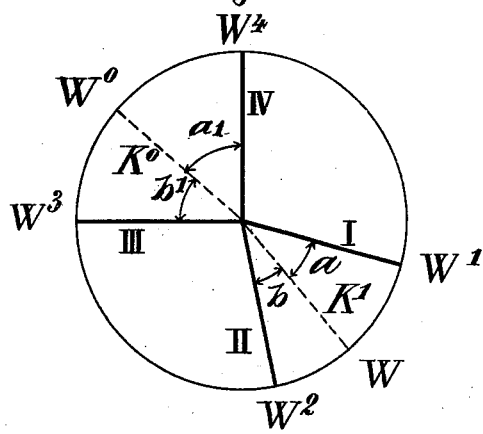
Figure 2:
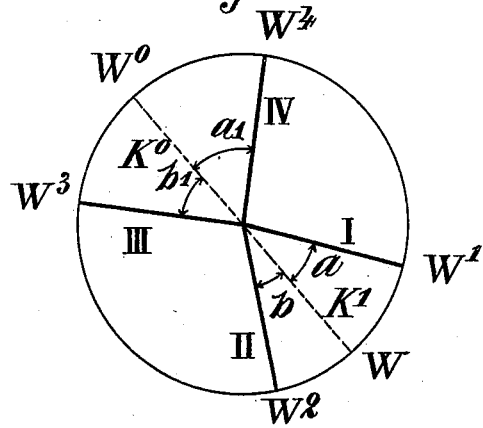
Figure 3:
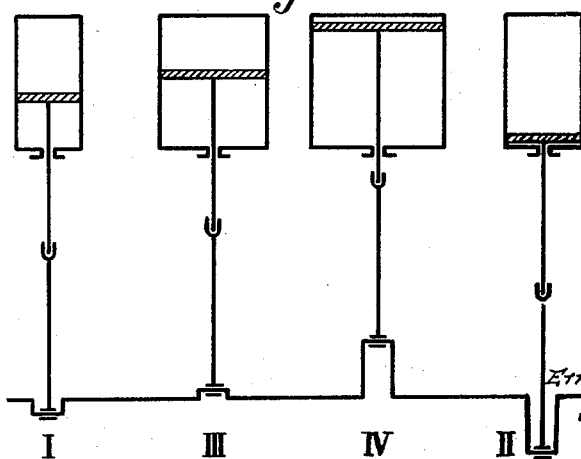

Figure 1 is a diagrammatical end view of the crank-shaft of a four-cylinder engine, showing the crank-arms arranged at angles adapted to compensate the reaction forces of the moving elements. Fig. 2 is a similar view, but showing the crank-arms arranged at such angles that the reaction forces due to the finite length of the connecting and like rods are also compensated by the moving elements themselves. Fig. 3 is a diagrammatical side view of a four-cylinder engine arranged and compensated or balanced according to this invention. Figs. 4 and 5 are side and end elevations of a four-crank engine in which the reactive forces engendered by the moving elements, pistons, piston and connecting or like rods upon the crank-shaft, as well as the reaction forces due to the finite length of the rods, are compensated. Figs. 6 and 7 are balance diagrams illustrating the practical carrying out of my invention. Figs. 1ª to 6ª are diagrams illustrative of the mode of compensating the reaction forces.

It is well known that the reaction force engendered by the movement of the piston-rods, connecting-rods, &c., and acting upon a revolving crank-shaft can be determined with great exactness. This reaction force may be compensated or annulled by an equivalent force acting upon a second crank arranged at an angle of ninety degrees to the said first crank and actuated by rods, &c., equal to that of the first crank. The sum of the reaction forces of the weights moved by the said two cranks then varies according to the same law, as if connecting-rods, &c., of an infinite length were used. In four-crank engines, for instance, in which the reaction forces engendered by the moving elements or weights have been compensated as far as possible, as described, for instance, in my application for patent, filed September 6, 1895, Serial No. 561,629, and in which for this reason the crank-arms supposed to be of equal length and distance apart have the relative angular position shown in Fig. 1, the injurious reaction forces due to the finite length of the rods may also be balanced in the following manner:

Referring to Fig. 1, let it be supposed that the connecting-rods, &c., in consequence of their finite length act upon the several cranks I II III IV with weights $W'$, $W^2$, $W^3$, and $W^4$, respectively. It is obvious that the cranks I and II may be replaced by one single crank $K'$, placed at a certain intermediate position between the said cranks I and II and acted upon by a weight W. (See Fig. 1.) As the weights acting upon the cranks I and II and the angle between them—that is to say, the sum of the angles between these cranks and the intermediate substitute crank are known—the unknown quantities or values— viz., the weight W and the angles between the cranks I and II and the substitute crank K—may be easily computed or calculated, thus finding out the proper relations for the said crank K. The effect or influence of the length of the connecting-rod, &c., upon the crank to be substituted for the cranks I and II is exactly the same as the sum of the effects or influences of the lengths of the connecting-rods, &c., upon said cranks I and II. In quite a similar manner the cranks III and IV may be replaced by a substitute crank $K^0$, acted upon by a weight $W^0$ and the values of the latter and the angles between the said cranks III, IV, and $K^0$ computed or calculated. By placing the four cranks I, II, III, and IV at the angles $a\ b\ a'\ b'$ to one another in a crank-circle so that the separating-lines between the said angles or the center lines of the substitute cranks form a straight line or diameter of the crank-circle, Fig. 2, the proper position of the cranks will be obtained, in which the reaction forces or effects due to the finite length of the rods, &c., are also compensated.

In Figs. 4 and 5, F indicates the main frame; 1, 2, 3, and 4, the four cylinders; R, the piston-rods; $r$, the connecting-rods; S, the crank-shaft, and I, II, III, and IV the cranks on said shaft, Fig. 5 showing clearly the angular relation of said cranks. In a similar manner the forces exerted or produced by the finite length of the connecting-rods, &c., of other multiple-cylinder engines may also be compensated, in which case the rods are regarded, indeed, only as reciprocating driving elements, whereas, in fact, they exert also lateral forces and their centers of gravity describe the path of an ellipse, but the slight inaccuracies due to this fact need not be considered in practice. Thus, for instance, an engine having more than three cylinders and cranks, such as shown in Figs. 4 and 5, in which 1, 2, 3, and 4 indicate the cylinders, $\delta$ the crank-shaft, I, II, III, and IV its cranks, and R $r$ the piston and connecting rods, the forces engendered by the moving elements of the cylinders and acting upon the crank-shaft may be indicated by Q and determined with very great exactness from the following formula:

$$Q = \frac{P\ v^2}{g\ R}\left(\cos.\ w + \frac{R}{L}\cos.\ 2\ w\right),$$

in which P indicates the weight of the reciprocating parts acting upon the crank; $v$, the angular velocity at which the crank revolves; $w$, the varying angle formed by the crank and the line of direction of the piston-rod, (see Fig. 1;) $g$, the gravital acceleration; R, the radius of the crank; L, the length of the connecting-rod.

In a given engine at a uniform angular velocity of the crank the value $\frac{v^2}{g\ R}$ is, however, constant and may be designated by C in order to simplify matters, which value C may also be assumed in a given case as unit—that is to say, $\frac{v^2}{g\ R}=1$. Equation 1 will then obtain the following form:

$$Q = P\left(\cos.\ w + \frac{R}{L}\cos.\ 2\ w\right).$$

The value of Q therefore consists of the sum of two values, of which the first one varies or changes proportionally to cos. $w$ and the second one, which represents the force or influence produced by the finite length of the connecting-rod, proportionally to cos. 2 $w$.

During a full revolution of the crank in the direction of the arrow shown in Fig. $1^a$ the angle $w$ continuously increases from zero to three hundred and sixty degrees, so that at the five main angles—zero, ninety degrees, one hundred and eighty degrees, two hundred and seventy degrees, and three hundred and sixty degrees—the values of cos. $w$ will be $+1 \pm 0 -1 \mp 0$ and $+1$, respectively. From this the varying value P cos. $w$ may be represented graphically by forming a system of coördinates the abscissa $x\ x$ of which is equal to the rectified length of the crank-circle, while the five main ordinates are equal to the varying value P cos. $w$, so that as cos. $w$ is equal to $+1, \pm 0, -1,$ or $\mp 0$, respectively, the ordinates will have successively the values $+P, \pm O, -P, \mp O,$ and $+P$, from which the curve $a\ a\ a\ a$ results. The course of this curve indicates the varying force which is engendered by the rotation of a crank without regard to the inaccuracies due to the finite length of the connecting-rod and which force may be compensated by the means already described in my application for Letters Patent of the United States of even date herewith, Serial No. 561,629.

The value of $\frac{R}{L}$ cos. 2 $w$ not yet considered may also be represented in an analogous manner by a curve $b\ b\ b$, crossing the abscissa $x\ x$ four times. By graphically uniting or adding both curves $a\ a$ and $b\ b$ a curve $c\ c$ is produced, which indicates the actual varying force, including also that due to the finite length of the connecting-rod. From the above exposition it is obvious that the value $\frac{R}{L}$ cos. 2 $w$ is compensated or annulled by an equivalent value acting as a force upon a second crank arranged at an angle of ninety degrees to the first crank and actuated by a connecting and piston rod equal to the first connecting and piston rod. This new value may also be represented, as shown in Fig. $3^a$, by a curve $b'\ b'$, which in consequence of placing the cranks at an angle of ninety degrees to each other has minus ordinates where the curve $b\ b$ shows plus ordinates, and vice versa. On uniting or adding both these curves the value zero will be obtained. The sum of the forces of the weights acting upon the said two cranks then varies according to the same law as if connecting-rods of an infinite length were used.

If it is desired to compensate, for instance, in a four-crank engine, the forces due to the weights W′ and W², Fig. 4ª, acting upon the two cranks K′ and K², which cranks have equal lengths and form the acute angle δ by means of the forces due to the weights W³ W⁴, Fig. 5, acting upon the cranks K³ K⁴, which have the same length as the cranks K′ K², so in the first line the cranks K′ and K², in order to compensate both the values $\frac{R}{L}$ cos. 2 $w$, which come here in question, may be replaced by one single crank K, placed in an intermediate position between the said cranks K′ K² and acted upon by a weight W. In this case the value of the force P $\frac{R}{L}$ cos. 2 $w$ may be expressed for the crank K′ by W′ $\frac{R}{L}$ cos. 2 $(\gamma-\alpha)$, for the crank K² by W² $\frac{R}{L}$ cos. 2 $(\gamma-\beta)$, and for the substitute crank K by W $\frac{R}{L}$ cos. 2 $\gamma$, wherein $\alpha$ $\beta$ $\gamma$ designate the angles formed by and between the crank-arms, and shown in Fig. 4ª. In order that the intermediate crank may pass for the other two cranks, the following condition must be fulfilled:

$$W \frac{R}{L} \cos. 2 \gamma =$$
$$W' \frac{R}{L} \cos. 2 (\gamma-\alpha) + W^2 \frac{R}{L} \cos. 2 (\gamma+\beta),$$

or $$W \cos. 2 \gamma =$$
$$\begin{Bmatrix} W' \cos. 2 \gamma \cos. 2 \alpha + W' \sin. 2 \gamma \sin. 2 \alpha + \\ W^2 \cos. 2 \gamma \cos. 2 \beta - W^2 \sin. 2 \gamma \sin. 2 \beta \end{Bmatrix}.$$

The angles alpha and beta must have such relation to each other that the value W′ sin. 2 $\alpha$ is equal to W² sin. 2 $\beta$. From the above equation it follows, then, that $$W \cos. 2 \gamma =$$
$$W' \cos. 2 \gamma \cos. 2 \alpha - W^2 \cos. 2 \gamma \cos. 2 \beta,$$

or $$W = W' \cos. 2 \alpha - W^2 \cos. 2 \beta, \quad (3)$$

and, according to the relation assumed with respect to the angles $\alpha$ and $\beta$, $$W' \sin. 2 \alpha \; W^2 \sin. 2 \beta. \quad (4)$$

As the sum of the angles $\alpha$ and $\beta$ is a known function δ, the unknown quantities W, $\alpha$, and $\beta$ may be computed or calculated easily from the equations 3 and 4, thus finding out the proper relations for the substitute crank K. The effect or influence of the length of the connecting-rod upon the crank K is exactly the same as the sum of the effects or influences of the lengths of the connecting-rods upon the cranks K′ and K² to be substituted. The other two cranks K³ and K⁴, as shown in Fig. 5ª, may be acted upon by the weights W³ and W⁴ and be placed at an angle $\alpha'$ $\beta'$ to each other. In order to obtain as far as possible simple trigonometrical functions, the substitute crank K⁰ may be arranged at right angles to the line separating the angles $\alpha'$ and $\beta'$ from each other. For this substitute crank the following condition must be fulfilled:

$$W^0 \cos. 2 (\gamma+90°) =$$
$$W^3 \cos. 2 (\gamma-\beta') + W^4 \cos. (\gamma+\alpha'),$$

or $$W^0 \cos. (2 \gamma+180°) =$$
$$W^3 \cos. (2 \gamma-2 \beta') + W^4 \cos. (2 \gamma+2\alpha').$$

$$W^0 \cos. 2 \gamma \cos. 180° - W^0 \sin. 2 \gamma \sin. 180° =$$
$$\begin{Bmatrix} W^3 \cos. 2 \gamma \cos. 2 \beta' + W^3 \sin. 2 \gamma \sin. 2 \beta' + \\ W^4 \cos. 2 \gamma \cos. 2 \alpha - W^4 \sin. 2 \gamma \sin. 2 \alpha \end{Bmatrix},$$

or $$-W^0 \cos. 2 \gamma =$$
$$\begin{Bmatrix} W^3 \cos. 2 \gamma \cos. 2 \beta' + W^3 \sin. 2 \gamma \sin. 2 \beta' + \\ W^4 \cos. 2 \gamma \cos. 2 \alpha' - W^4 \sin. 2 \gamma \sin. 2 \alpha' \end{Bmatrix}.$$

The angles $\alpha'$ and $\beta'$ may have such a relation to each other that W³ sin. 2 $\beta'$ is equal to W⁴ sin 2 $\alpha'$. Then is $$W^0 \cos. 2 \gamma =$$
$$W^3 \cos. 2 \gamma \cos. 2 \beta' + W^4 \cos. 2 \gamma \cos. 2 \alpha',$$

or $$-W^0 = W^3 \cos. 2 \beta' + W^4 \cos. 2 \alpha'. \quad 95$$

$$W^0 =$$
$$W^3 \cos.(180°-2 \beta') + W^4 \cos.(180°-2 \alpha'), \quad (5)$$

and, according to the supposed relation of the angles $\alpha'$ and $\beta'$, $$W^3 \sin. 2 \beta' = W^4 \sin. 2 \alpha'. \quad (6)$$

From these equations 5 and 6 the values of the unknown quantities W⁰, $\alpha'$, and $\beta'$ may be obtained in the well-known manner.

By placing the four cranks K′ K² K³ K⁴ at the angles $\alpha$ $\beta$ $\alpha'$ $\beta'$ to one another in a crank-circle so that the separating-lines or radius between the said angles form a straight line or a diameter of the crank-circle, Fig. 6ª, the proper position of the cranks will be obtained, in which the forces or effects due to the finite length of the connecting-rods are compensated. Consequently $$W = W^0,$$

$$W' \cos. 2 \alpha + W^2 \cos. 2 \beta =$$
$$W^3 \cos.(180°-2 \alpha') + W^4 \cos.(180°-2 \beta'), \quad (7)$$

and also $$W' \sin. 2 \alpha = W^2 \sin. 2 \beta$$
$$W^3 \sin. 2 \beta' = W^4 \sin. 2 \alpha',$$

as assumed above. Hence if these conditions are fulfilled then the forces due to the finite length of the connecting-rods will be perfectly compensated or balanced. Besides this, of course also the other forces engendered by the moving elements of the engine must be compensated or eliminated, for instance, by the means described in my application above referred to. In a similar manner the forces exerted or produced by the finite length of the connecting-rods of other multiple-cylinder engines may also be compensated, in which case the rods are regarded, indeed, as only reciprocating driving elements, whereas in fact they perform also lateral motions, and their centers of gravity describe the path of an ellipse; but the slight inaccuracies due to this fact need not be considered in practice. The herein-described means may also be used in the balancing of the forces exerted by the steering-gear or other moving elements.

Referring to the balance diagrams Figs. 6 and 7, having given the weights $P_3$ $P_4$ of the moving parts of the cylinders Nos. 3 and 4, the distances between the cylinder axes, and the relative position of cranks Nos. 3 and 4, the latter leading the former by one hundred and four degrees, the total weights of the moving parts for cylinders Nos. 1 and 2 and their cranks Nos. 1 and 2 are found in the manner described in my application for patent above referred to, (description of balance diagrams,) the results being indicated in Figs. 6 and 7. Crank No. 1, total weight of moving parts $P_1$ equals nine thousand two hundred and fifty pounds. Crank No. 2, total weight of moving parts $P_2$ equals nine thousand two hundred and fifty pounds. Crank No. 3, total weight of moving parts $P_3$ equals twelve thousand six hundred pounds. Crank No. 4, total weight of moving parts $P_4$ equals twelve thousand six hundred pounds. Each of the total weights of $P_1$ $P_2$ $P_3$ $P_4$ is composed of a revolving and a reciprocating weight, which may be indicated by $V_1$ $W_1$, $V_2$ $W_2$, $V_3$ $W_3$, and $V_4$ $W_4$, said weights being tabulated in Fig. 6.

The weights $P_1$ $P_2$, &c., acting upon the cranks Nos. 1, 2, &c., set at the angles shown in Fig. 7, result in a perfect balance, those forces due to the finite length of the piston and connecting-rods being left out of consideration—that is to say, it being assumed that the connecting-rods are of infinite length, but the revolving weights $V_1$ $V_2$, &c., which may be considered as having connecting-rods of infinite length, are included in the weights $P_1$ $P_2$, &c. Therefore in order that the forces engendered by the finite length of the connecting-rods may be compensated it will be sufficient that the reciprocating weights $W_1$ $W_2$, &c., are brought into certain relations with each other and with the crank-angles.

Referring to Fig. 2, $W_1$, $W_2$, $W_3$, and $W_4$ are the reciprocating weights that act upon cranks Nos. 1, 2, 3, and 4, respectively. Cranks 1 and 2 may be replaced by a single imaginary crank $K'$, acted upon by a weight $W$, the position of said crank and weight being such that (1)  $W_1 \sin 2\alpha = W_2 \sin 2\beta$, and (2)  $W = W_1 \cos 2\alpha + W_2 \cos 2\beta$.

Referring to formula (1), $W_1 = W_2 = 3968$.

$\therefore \alpha = \beta = 33°$.

Hence from formula (2)

$W = 3968 \cos 66° + 3968 \cos 66°$;

that is, (3)  $W = 3227$.

Similarly cranks 3 and 4 may be replaced by a single imaginary crank $k_0$, acted upon by a weight $W_0$, the position of $K_0$ $W_0$ being such that (4)  $W_3 \sin 2\alpha_1 = W_4 \sin 2\beta_1$, and (5)  $W_0 = W_3 \cos 2\alpha_1 = W_4 \cos 2\beta_1$.

Referring to formula (4), $W_3 = W_4 = 6672$.

$\therefore \alpha_1 = \beta_1 = 52°$.

Hence from (5)

$W_0 = 6672 \cos 104° + 6672 \cos 104°$.

$W_0 = 2[6672(-\cos 76°)]$.

(6)  $W_0 = 3227$.

Therefore we have $W = 3227$ and $W_0 = 3227$, and the center lines of cranks $K_1$ and $K_0$ form a straight line, for $33° + 95° + 52° = 180°$.

Hence the effects produced by W and $W_0$ neutralize each other, since they are equal and opposite—that is to say, the forces engendered by the reciprocating weights $W_1$ $W_2$ $W_3$ $W_4$ due to the finite length of their connecting-rods are compensate.

*Compensation of valve-gears*, (referring to Figs. 6 and 7.)—A weight $Q_1$ on No. 1 crank-circle at the position shown and a weight $Q_2$ on No. 2 crank-circle at the position shown together balance the whole system of valve-gears, these weights being determined in the manner described in my aforementioned application, (description of balance diagrams.)

The herein-described means may also be used in the balancing of the reaction forces engendered by the steering-gear or other moving elements.

Having thus described my invention, what I claim as new therein, and desire to secure by Letters Patent, is—

1. In a steam or like motive-power engine, the combination with the cylinders arranged side by side with their longitudinal axes at predetermined distances apart, and the moving elements of said cylinders, namely their pistons and parts reciprocating therewith; of a shaft having four cranks acted upon by said moving elements set at different angles, the angular relation of said four cranks varying in accordance with and being determined by their length, the distances between them, the weights of the aforesaid moving elements and the finite length of the connecting-rods to balance the reaction forces acting upon the crank-shaft and engendered by the weight of said moving elements and resulting from the finite length of said rods, substantially as set forth.

2. In a steam or like motive-power engine, the combination with cylinders of different diameters arranged side by side with their longitudinal axes at predetermined distances apart, and the moving elements of said cylinders, namely their pistons and parts reciprocating therewith; of a shaft having four cranks acted upon by the said moving elements set at different angles, the angular relation of said four cranks varying in accordance with and being determined by their lengths, the distances between them, the weights of the aforesaid moving elements and the finite length of the connecting-rods to balance the reaction forces acting upon the crank-shaft and engendered by said moving elements and resulting from the finite length of said rods, substantially as set forth.

3. In a steam or like motive-power engine, the combination with cylinders of different diameters arranged side by side with their longitudinal axes at predetermined distances apart, the cylinders of greater diameter between those of less diameter, and the moving elements of said cylinders, namely their pistons and parts reciprocating therewith; of a shaft having four cranks acted upon by said moving elements set at different angles, the angular relation of said four cranks varying in accordance with and being determined by their lengths, the distances between them, the weights of the aforesaid moving elements and the finite length of the connecting-rods to balance the reaction forces acting upon the crank-shaft and engendered by said moving elements and resulting from the finite length of said rods, substantially as set forth.

4. In a steam or like motive-power engine, the combination with the cylinders arranged side by side with their longitudinal axes at predetermined distances apart, the moving elements of said cylinders, namely their pistons and parts reciprocating therewith and the valve-gears; of a shaft acted upon by said reciprocating elements and valve-gears and having four cranks set at different angles, the angular relation of said four cranks varying in accordance with and being determined by their length, the distances between them, the weights of said moving elements and valve-gears and the finite length of the connecting-rods, to balance the reaction forces acting upon the crank-shaft and engendered by the weight of said parts and resulting from the finite length of the connecting-rods, substantially as described.

In testimony that I claim the foregoing as my invention I have signed my name, in presence of two witnesses, this 22d day of August, 1895.

ERNST OTTO SCHLICK.

Witnesses:
MAX LEMCKE,
E. H. L. MUMMENHOFF.